Dec. 14, 1937.  W. BENNETT  2,102,454
CLEAR VISION ANTIGLARE WINDSHIELD
Filed June 25, 1937
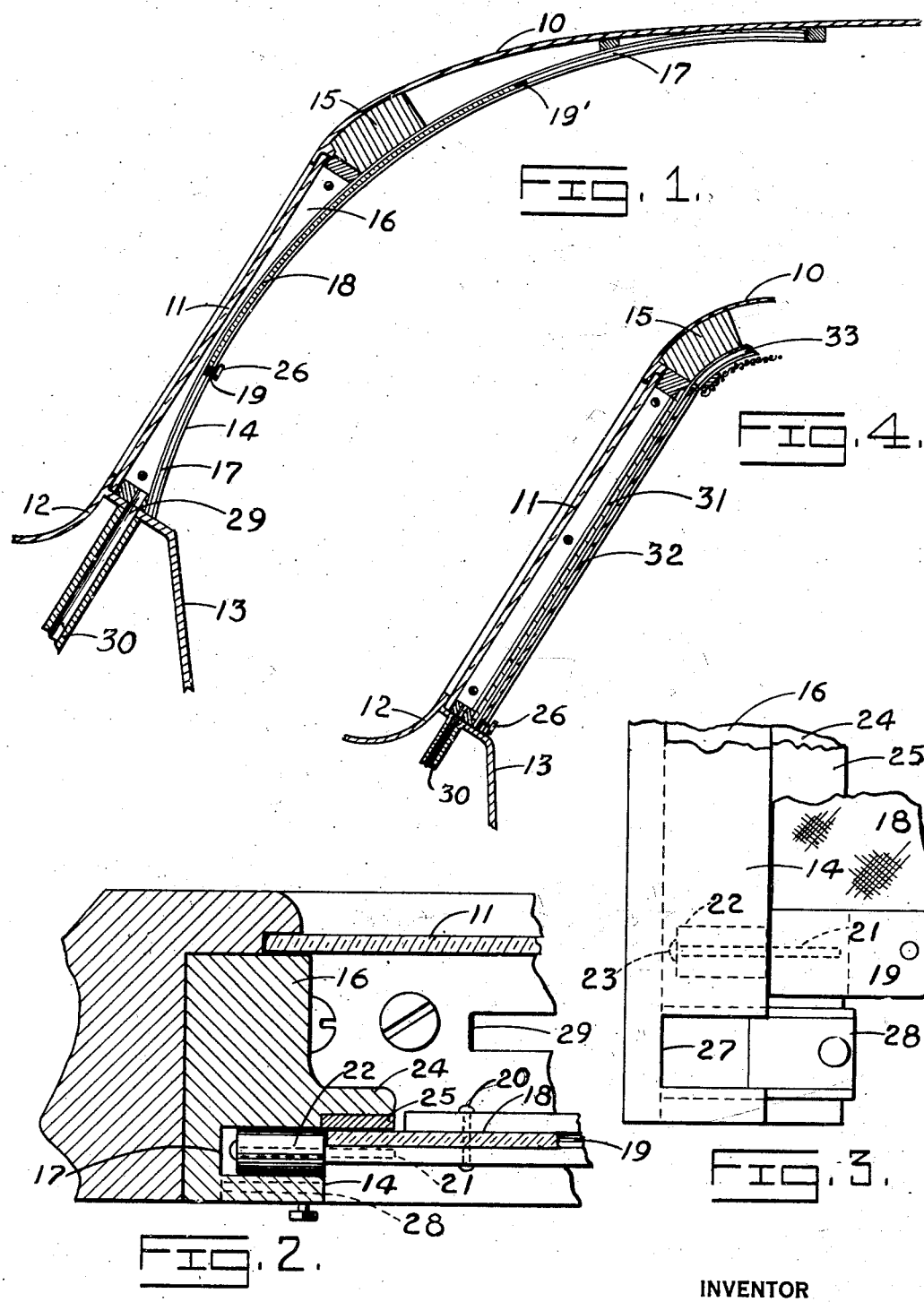
INVENTOR
William Bennett Patented Dec. 14, 1937

2,102,454

UNITED STATES PATENT OFFICE 2,102,454

CLEAR-VISION ANTIGLARE WINDSHIELD

William Bennett, Westbury, N. Y.

Application June 25, 1937, Serial No. 150,255

3 Claims. (Cl. 296—84)

This invention relates to improvements in clear-vision anti-glare windshields for automobiles, aeroplanes, motor-boats, and the like.

The chief cause of automobile accidents has been said to lie in the limitations of human vision. At night, with twenty per cent of the automobiles moving, over sixty per cent of the accidents occur; most of these are attributable to headlight glare.

Vision at night on the road narrows to a single channel of light in which the eye can function. Headlights of an oncoming car cause the eye pupils to contract suddenly; the other car suddenly disappears, but the eye pupils take several minutes to return to their normal size for night driving. Dark adaptation of the retina and dilation of the pupils in darkness are slow.

Stepping from bright illumination into darkness, it takes an appreciable time before one can see in the dark. Following exposure to dazzling headlights, after a car has passed we literally drive blind. This is true even if other cars dim their headlights.

While attempts have been made to improve this condition through adjusting the direction of or reducing headlight glare, brilliant light is essential to light up the road; hence, it is believed that any improvement in vision must be effected, not with relation to headlights, but through protection of the eyes, as by interposition of filtering means to reduce glare and thus eliminate the "dark spot" in which one drives at night immediately after subjection to opposing dazzling headlights.

It is fully recognized that anti-glare shades or sheets of transparent, tinted material are old in the art, as is the provision of a chamber between the windshield and a transparent member wherein heat, generated electrically or otherwise, is confined for defrosting; and that it is old as well to provide adjustable opaque sun visors. But all such devices are open to various objections: first, a plurality of different devices now serve what should have long since been universally recognized as a single purpose; that is, clear and protected vision under all conditions. Defrosting devices attached in various ways to the windshield interfere with and restrict vision, are in the way when not in use, or have to be removed and carefully stored. Sun visors also restrict vision and must be continuously readjusted as the car on the road takes a new direction.

As a result of this situation, such means as have been heretofore proposed either for protecting the eyes or for maintaining the windshield clear, being either too flimsy or impractical in construction, inconvenient or awkward in arrangement, design or operation, car manufacturers have generally avoided adopting them as standard equipment for their cars, despite the growing movement for safe-driving.

My invention relates to clear-vision anti-glare windshields and has for its primary object to protect the eyes and improve vision under all adverse weather conditions by the provision of a unitary structure (equipment with the now standard windshield wiper being assumed), which includes both a defrosting and an anti-glare unit, all three elements, wiper, defroster, and glare-filter, being adapted for use together in combination or independently one of the others, as necessary or desirable, to protect the driver from impaired vision caused by rain, snow, sleet or ice forming on the outer surface, or from steam forming on the inner surface of the windshield, and from any blinding light, such as sunlight or that of opposing headlights at night.

Another object is to provide a combination defrosting and vision protecting windshield of very simple construction and inexpensive to manufacture which will not restrict the area of visibility provided by the car manufacturer, and which may be quickly and readily brought into effective position or dispensed with as desired.

A still further object is to provide a defrosting chamber wherein heated air is concentrated across that portion of the windshield which is most used and in the line of the driver's vision.

A still further object is to provide an additional element of safety against flying glass which may be the result of an accident at night or during dangerous driving conditions, such as in a snowstorm.

Other objects and advantages of my invention will become apparent as the specification proceeds.

With the foregoing objects in view, my invention consists of the novel combination and arrangement of parts hereinafter described in their preferred embodiment, particularly pointed out in the appended claims, and illustrated in the accompanying drawing, wherein like parts are designated by the same reference characters throughout the several views.

In the drawing:

Figure 1 is a section through the windshield of an automobile, showing broken away portions of the top and cowl;

Fig. 2 is a horizontal section of an enlarged detail view through one corner-post and a portion of the windshield;

Fig. 3 is a view similar to Fig. 2, but showing the same parts in elevation; and, Fig. 4 is a view similar to Fig. 1 showing a modification of my invention.

Referring to Fig. 1, 10 is a portion of the so-called "turret" top of an automobile, 11 is a permanently fixed safety-glass windshield, 12 the cowl, and 13 the dash, these parts all being shown in section. A pair of parallel-spaced, curved, grooved tracks 14 (only one of which is shown) may be fastened to the windshield header 15, to cross struts of the top, and to the sides of the windshield frame, as at 16. The grooves 17 of the tracks 14 face each other, and the tracks are curved in true arcs having a common center. The lower half of the tracks 14 may be built as an integral part of the windshield retaining frame, the side members thereof thus being concave to coincide with the curve of the tracks on the inside and straight along their edge which contacts with the windshield glass 11.

Slidable in the tracks 14 is a transparent, semi-flexible curtain 18 of about $\frac{3}{32}''$ in thickness, and which may be made from a single sheet of material such as "Paracele"; or, if desired, a rigid sheet formed to coincide with the curve of the tracks 14 may be used, such as safety-glass similar to that of the windshield. This curtain 18, being tinted amber, green, blue, or other color, is adapted to filter out objectionable glare and thus protect the eyes of the driver. In its rigid form of a curved sheet of safety glass the curtain may be composed of a lamination of clear glass, one of cellulose material, and a third lamination of special glass which is tinted, such as "Polaroid", "Crookes", "Fieuzel", "Smoke", or "Maylite", and in this event, while the cost will of course be greater, the finest known type of protection and safety will be attained.

Referring to Figs. 2 and 3, the lower edge of the curtain 18 is bound with a U-shaped metal strip 19 to which it is fastened as by rivets 20. Integral at each end of the strip 19 is a projecting pin 21 upon which is mounted for rotation a roller 22, the roller being retained on the pin by riveting the head of the latter as at 23. The rollers 22 extend into and are adapted to run in the grooves 17 of the track 14, which they fit snugly, and thus the entire strain and any vibration is taken from the curtain 18. One side of each track 14 is formed with a longitudinal flange 24 which extends inwardly and the surface of which is faced with felt or similar material 25 upon which the side edges of the curtain 18 rest and slide. Centrally positioned on the inner side of the strip 19 is a knob 26 (Fig. 1) for moving the curtain. When semi-flexible resilient material is used, the curtain 18 in the tracks 14 will stay at any position to which it may be drawn. A binding strip 19' similar to 19 is provided for the upper edge of the curtain, which strip has corresponding pins and rollers to facilitate the sliding movement thereof, and has in addition spaced apertures therethrough and through the curtain (not shown).

Adjacent their lower ends the tracks 14 are provided with notches 27, in which are fitted removable slides 28, to allow of disengagement therethrough of the rollers 22 from the tracks, thus freeing the curtain 18 which, held by the rollers integral with its upper binding strip, may then be swung inward for cleaning its inside convex surface. Any suitable form of catch (not shown) may be provided to hold the curtain positively in raised position.

A conduit 30 serves to conduct heat upward from the usual car heater (not shown) through a slot 29 in the windshield moulding to the space between the windshield and curtain for defrosting or preventing the formation of steam thereon.

In operation, the curtain 18 may be lowered as desired to protect the driver's eyes against any glaring light, at which time it completes the formation of a chamber for confining heat and thus greatly increases defrosting efficiency. Because of its arcuate shape: when lowered the curtain 18 approaches nearest to the windshield glass 11 at the horizontal central portion thereof and rising heat from the slot or slots 29 is as a result concentrated across the most used portion of the windshield in the driver's customary line of vision, after which it escapes through the vented upper strip 19'. Further, because of the curtain's arcuate form, efficiency in deflecting glaring light is greatly increased. As will be clear from Fig. 1, when the concave curtain is made of rigid material, due to the common center of the arc formed by the curtain and tracks and the coincident streamlines of the windshield and car top, the curtain is compactly and neatly disposed of and hidden under the upholstery of the car top; and where the angle of the particular windshield and top is not streamlined and renders impracticable the utilization of a true arc and thus the use of rigid material, a flexible curtain may be used to take an abrupt curve in the tracks.

Referring to Fig. 4, the defrosting chamber is made permanent in this form by the provision of a fixed, untinted transparent member 31 spaced from the windshield 11, while a movable tinted screen 32 is adapted to slide in tracks 33 into position immediately in back of the member 31. Thus defrosting may be effected in conjunction with or without the light-filtering means, as desired, and thus the driver is assured of complete protection for his vision under all conditions, and by simple unitary means, as distinguished from the plurality of more or less ineffective devices now available.

While I have shown the curtain 18 as manually operated, it is of course obvious that various means may be provided for its automatic operation, such as an electric reversing motor, vacuum power from the engine, or other mechanical means. And it will also be obvious that, where the car has a divided windshield, my invention may be conveniently formed with central double tracks in two independent units, each with its own heat supply and each independently operable.

Although the drawing and the above specification disclose the best mode in which I have contemplated embodying my invention, I desire to be in no way limited to the details of such disclosure for, in the further practical application of my invention, changes in the constructional details of the device may be made as circumstances require or experience suggests, without departing from the spirit of the invention within the scope of the appended claims.

What I claim is:

1. A clear-vision windshield for automobiles and the like comprising, a fixed, flat, transparent sheet of "Safety" glass, a transparent, concave, tinted member spaced from and aligned with said glass, tracks curved to correspond to the arc formed by the concave member and wherein said member is adapted to be slid out of alignment with the glass, air-heating means, means for conducting and delivering heated air to the space between the glass and transparent member, and means for releasing said transparent member from said tracks.

2. A clear-vision windshield for automobiles and the like comprising, a fixed sheet of glass, a transparent light-filtering horizontally-concave screen, curved and grooved tracks extending from the lower edge of the glass up into the top of the automobile, a felt-faced longitudinal flange formed on said tracks, rigid binding strips on the upper and lower edges of the screen, pins integral with and extending from both ends of each of said strips, rollers rotatable on said pins adapted to run in said grooves, whereby the screen is held in contact with the flange, and means for disengaging said rollers from said track grooves.

3. A clear-vision windshield for automobiles and the like comprising, a frame, a sheet of glass fixed therein, a second frame within the first frame adapted to act as a stop to hold the glass, the side members of said second frame being formed to constitute grooved tracks, a semi-cylindrical, semi-flexible, transparent, light-filtering screen, slidable in said tracks and when in its lowermost position spaced from said glass and constituting with the latter the walls of a chamber, vents in said screen adjacent its upper edge, a heater, a conduit communicating therewith and having an outlet to deliver heated air to said chamber, and removable slides fastened in notches formed adjacent the lower ends of said tracks whereby the screen may be disengaged therefrom.

WILLIAM BENNETT.